United States Patent
Chou et al.

(10) Patent No.: US 10,696,239 B2
(45) Date of Patent: Jun. 30, 2020

(54) USE OF A LENTICULAR LENS ARRAY TO APPLY A DISPLAY INSIDE OF A VEHICLE

(71) Applicant: Toyota Motor Engineering & Manufacturing North America, Inc., Plano, TX (US)

(72) Inventors: Chungchih Chou, Ann Arbor, MI (US); Ercan M. Dede, Ann Arbor, MI (US); Paul D. Schmalenberg, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 16/203,474

(22) Filed: Nov. 28, 2018

(65) Prior Publication Data
US 2020/0164812 A1 May 28, 2020

(51) Int. Cl.
*B60R 11/02* (2006.01)
*G02B 27/09* (2006.01)
*G06F 3/01* (2006.01)

(52) U.S. Cl.
CPC ...... *B60R 11/0235* (2013.01); *G02B 27/0955* (2013.01); *G06F 3/013* (2013.01)

(58) Field of Classification Search
CPC .. B60R 11/0235; G02B 27/0955; G06F 3/013
USPC ....................................................... 348/837
See application file for complete search history.

(56) References Cited

U.S. PATENT DOCUMENTS

| | | | |
|---|---|---|---|
| 3,764,179 A | 10/1973 | Burton | |
| 4,095,841 A | 6/1978 | Thompson et al. | |
| 6,675,075 B1* | 1/2004 | Engelsberg | G02B 27/01 |
| | | | 345/4 |
| 7,494,256 B1 | 2/2009 | Kelman et al. | |
| 7,791,785 B2 | 9/2010 | Knafou et al. | |
| 9,030,465 B2 | 5/2015 | Hess | |
| 9,182,524 B2 | 11/2015 | Smithwick et al. | |
| 9,182,605 B2 | 11/2015 | Goulanian | |
| 9,684,166 B2 | 6/2017 | Kuehne | |

(Continued)

OTHER PUBLICATIONS

Tachi et al.; "Augmented Reality Helps Drivers See Around Blind Spots"; *IEEE Spectrum*; 5 pages; Jul. 18, 2018.

(Continued)

*Primary Examiner* — Thai Q Tran
*Assistant Examiner* — Nienru Yang
(74) *Attorney, Agent, or Firm* — Snell & Wilmer LLP (57) ABSTRACT

A system for displaying data inside of a vehicle includes a main body including a substrate forming a display surface and defining a vehicle interior. The system also includes a plurality of lenticular lenses located on the display surface. The system also includes an eye tracker designed to detect a location of eyes of a person relative to the display surface. The system also includes a light source designed to generate light to produce an image via the plurality of lenticular lenses. The system also includes an electronic control unit (ECU) coupled to the eye tracker and the light source and designed to determine the location of the eyes relative to the display surface and to control the light source to center the image based on the location of the eyes relative to the display surface.

20 Claims, 4 Drawing Sheets

(56) References Cited

U.S. PATENT DOCUMENTS

| | | | |
|---|---|---|---|
| 2007/0250778 A1* | 10/2007 | Saito | G06Q 30/02 |
| | | | 715/733 |
| 2010/0002079 A1 | 1/2010 | Krijin et al. | |
| 2010/0036717 A1* | 2/2010 | Trest | G06Q 30/0207 |
| | | | 705/14.1 |
| 2010/0253600 A1* | 10/2010 | Seder | B32B 17/10036 |
| | | | 345/7 |
| 2011/0266855 A1* | 11/2011 | Zimmerman, II | B60N 2/3013 |
| | | | 297/378.1 |
| 2017/0006279 A1* | 1/2017 | Eichenlaub | H04N 13/32 |
| 2017/0302914 A1 | 10/2017 | Tonar et al. | |

OTHER PUBLICATIONS

"Motor Company in Germany Unveiled a Transparent Car"; http://autopattvpro.com; 3 pages; May 15, 2017.

Broy et al; "Evaluating Stereoscopic 3D for Automotive User Interfaces in a Real-World Driving Study"; *Proceedings on the 33$^{rd}$ Annual ACM Conference Extended Abstracts on Humane Factors in Computing Systems*; 6 pages; Apr. 18, 2015.

Wientapper et al; "A Camera-Based Calibration for Automotive Augmented Reality"; *2013 IEEE International Symposium on Mixed and Augmented Reality (ISMAR)*; 10 pages; Oct. 1-4, 2013.

\* cited by examiner

USE OF A LENTICULAR LENS ARRAY TO APPLY A DISPLAY INSIDE OF A VEHICLE

BACKGROUND

1. Field

The present disclosure relates to systems and methods for using a lenticular lens array to apply an advanced display inside of a vehicle.

2. Description of the Related Art

Electronics of all types are increasing in quality and functionality and decreasing in cost. Due to this nature of electronics, vehicle manufacturers can include more and more features in their vehicles. These electronics range from display technologies to materials and optics. For example, some vehicles now include displays, such as screens located on seat backs, on which passengers may watch media such as TV or movies.

In addition to electronics, material science is also advancing. These types of technological advances may also be included in vehicles. For example, airbags may now include a silicon coating which allows them to be deployed while protecting the fabric from heat and reducing the likelihood of passenger burns from airbag deployment.

In addition to such electronic and material advances, vehicles are being designed to be autonomously driven. In that regard, vehicles may soon drive themselves without any input or control by a driver. This may free up all vehicle users to spend their time in the vehicle as they wish.

Therefore, it is desirable to develop more advanced display technologies inside of vehicles to improve the user experience while riding in vehicles.

SUMMARY

Described herein is a system for displaying data inside of a vehicle. The system includes a main body including a substrate forming a display surface and defining a vehicle interior. The system also includes a plurality of lenticular lenses located on the display surface. The system also includes an eye tracker designed to detect a location of eyes of a person relative to the display surface. The system also includes a light source designed to generate light to produce an image via the plurality of lenticular lenses. The system also includes an electronic control unit (ECU) coupled to the eye tracker and the light source and designed to determine the location of the eyes relative to the display surface and to control the light source to center the image based on the location of the eyes relative to the display surface.

Also disclosed is a system for displaying data inside of a vehicle. The system includes a main body including a substrate forming a display surface and defining a vehicle interior. The system also includes a floor cushion located in the vehicle interior and designed to convert between a seating position to form a platform for seating at least one driver or passenger of the vehicle and a stowed position for increasing a viewable area of the display surface. The system also includes a plurality of lenticular lenses located on the display surface. The system also includes a light source designed to generate light to produce an image via the plurality of lenticular lenses. The system also includes an electronic control unit (ECU) coupled to the light source and designed to control the light source to produce the image, and to control the floor cushion between the seating position and the stowed position.

Also disclosed is a method for displaying data inside of a vehicle. The method includes detecting, by an eye tracker, eye data corresponding to a location of eyes of a person relative to a display surface in a vehicle interior of the vehicle. The method also includes determining, by an electronic control unit (ECU), a location of the eyes relative to the display surface based on the eye data. The method also includes controlling, by the ECU, a light source to center an image via a plurality of lenticular lenses based on the location of the eyes relative to the display surface.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

The present disclosure describes systems and methods for providing advanced display systems inside of vehicles. The systems provide several benefits and advantages such as providing a display that can center an image based on where a user is looking. The systems provide additional benefits such as using lenticular lenses to allow the image to be centered at multiple locations, each based on where a separate user is looking. The use of lenticular lenses advantageously provides for a three-dimensional display without requiring use of any special glasses.

The systems further advantageously include a floor cushion that can transform from a raised position (in which one or more passengers may sit or otherwise rest on the floor cushion) to a stowed position (in which the floor cushion is lowered). Providing this adjustable seating advantageously allows vehicle passengers to view a greater portion of the display surface when fewer passengers are riding in the vehicle and allows for configurability of the vehicle based on the quantity of passengers.

An exemplary system includes a display surface, which may cover a majority of an interior of a vehicle main body. The system also includes lenticular lenses around the display surface. The system also includes an eye tracker that can detect where a vehicle passenger is looking, and a light source that generates media to be viewed on the display. The system also includes a floor cushion that can move between a raised position, forming a seat, and a stowed position. The system also includes an electronic control unit (ECU). The ECU may control the vehicle to travel autonomously, allowing all passengers to view the display surface. The ECU may determine a quantity of passengers and may control the floor cushion to form a quantity of seats that is equal to the quantity of passengers. The ECU may determine where each passenger is looking and may control the light source to center an image at a location where each passenger is looking.

Figure 1:
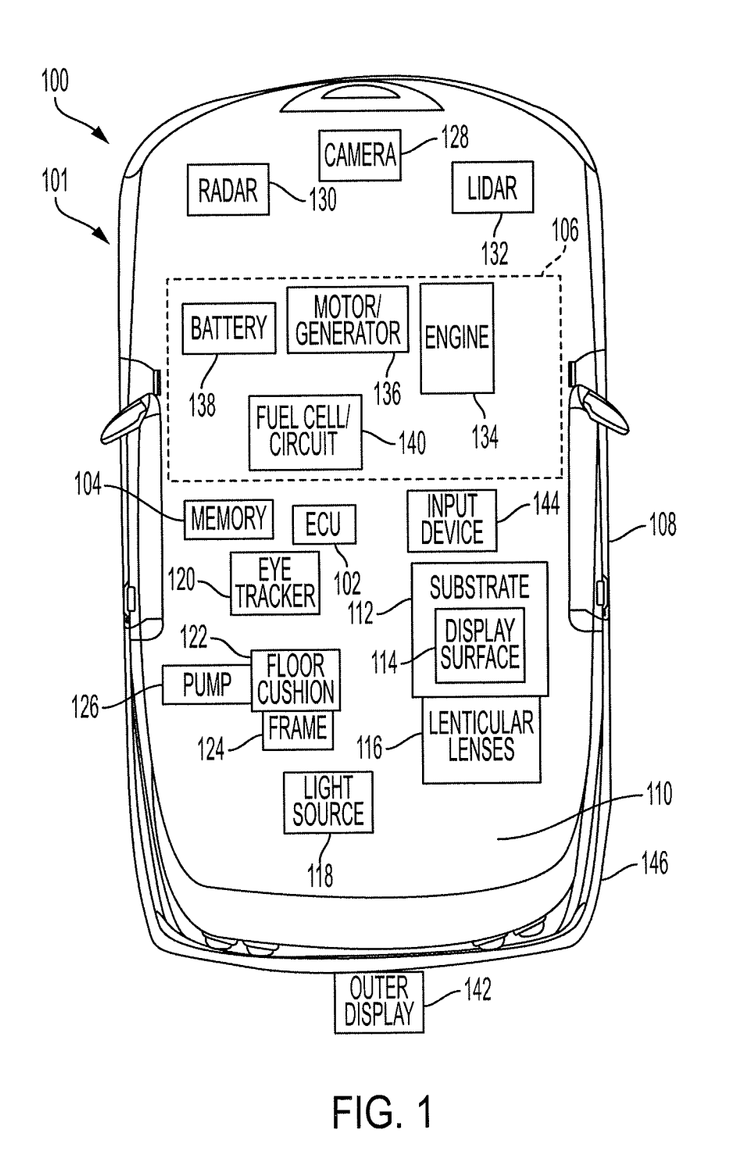
FIG. 1 is a block diagram illustrating a vehicle that includes a system for providing an advanced display system using lenticular lenses according to an embodiment of the present invention.

Turning to FIG. 1, a vehicle 100 includes a system 101 for displaying information inside of the vehicle 100. The vehicle 100 (or system 101) may include an ECU 102, a memory 104, a power source 106, and a main body 108 that defines a passenger compartment 110. The vehicle 100 (or system 101) may further include a substrate 112 which may be part of the main body 108 or may be separate from the main body 108. The vehicle 100 may further include a display surface 114 located on the substrate 112 and which may be a part of the substrate 112. The vehicle 100 may further include a plurality of lenticular lenses 116 which may be coupled to the substrate 112 or the display surface 114 or may be separate from each. The vehicle 100 may further include a light source 118 which may generate light for a display image to be shown via the lenticular lenses 116.

The vehicle 100 may further include one or more eye tracker 120 for detecting a location of eyes of a passenger or driver of the vehicle 100. The vehicle 100 may also include a floor cushion 122, a frame 124, and a pump 126. The vehicle may also include a plurality of sensors including a camera 128, a radar sensor 130, and a light imaging and ranging (LIDAR) sensor 132. The vehicle 100 may further include an outer display 142, an input device 144, and an e-paper layer 146 coupled to the main body 108.

The main body 108 may be propelled along a roadway, may be suspended in or on water, or may fly through air. The main body 108 may resemble a vehicle such as a car, a motorcycle, a boat, an aircraft, or the like. The main body 108 may further support an individual such as a driver, a passenger, or the like, who may be in the passenger compartment 110.

The ECU 102 may be coupled to each of the components of the vehicle 100 and may include one or more processors or controllers, which may be specifically designed for automotive systems. The functions of the ECU 102 may be implemented in a single ECU or in multiple ECUs. The ECU 102 may receive data from components of the vehicle 100, may make determinations based on the received data, and may control the operations of the components based on the determinations.

The vehicle 100 may be fully autonomous or semi-autonomous. In that regard, the ECU 102 may control various aspects of the vehicle 100 (such as steering, braking, accelerating, or the like) to maneuver the vehicle 100 from a starting location to a destination location. In some embodiments, the vehicle 100 may be used as a rideshare vehicle, in an autonomous, semi-autonomous, or fully driver-operated state. In that regard, the vehicle 100 may be operated independently of driver control and, occasionally, without a person inside of the passenger compartment 110.

The memory 104 may include any non-transitory memory and may store data usable by the ECU 102. For example, the memory 104 may store instructions usable by the ECU 102 to display certain information via the light source 118 and the lenticular lenses 116 based on data detected by the eye tracker 120.

The power source 106 may include any one or more of an engine 134, a motor-generator 136, a battery 138, or a fuel-cell circuit 140. The engine 134 may convert a fuel into mechanical power for propelling the vehicle 100. In that regard, the engine 134 may be a gasoline engine, a diesel engine, or the like.

The battery 138 may store electrical energy. In some embodiments, the battery 138 may include any one or more energy storage devices including a battery, a flywheel, a super capacitor, a thermal storage device, or the like.

The fuel-cell circuit 140 may include a plurality of fuel cells that facilitate a chemical reaction to generate electrical energy. For example, the fuel cells may receive hydrogen and oxygen, facilitate a reaction between the hydrogen and the oxygen, and output electricity in response to the reaction. In that regard, the electrical energy generated by the fuel-cell circuit 140 may be stored in the battery 138 and/or used by the motor-generator 136. In some embodiments, the vehicle 100 may include multiple fuel-cell circuits including the fuel-cell circuit 140.

The motor-generator 136 may convert the electrical energy stored in the battery 138 (or electrical energy received directly from the fuel-cell circuit 140) into mechanical power usable to propel the vehicle 100. The motor-generator 136 may further convert mechanical power received from the engine 134 or from wheels of the vehicle 100 into electricity, which may be stored in the battery 138 as energy and/or used by other components of the vehicle 100. In some embodiments, the motor-generator 136 may include a motor without a generator portion and, in some embodiments, a separate generator may be provided.

The substrate 112 may include any material and may be transparent, translucent, or opaque. For example, the substrate 112 may include glass, plastic, metal, or the like. The display surface 114 may include any surface on which the lenticular lenses 116 may be located. For example, the display surface 114 may include a portion of the substrate 112. As another example, the display surface 114 may include a mirror located behind the plurality of lenticular lenses 116. As yet another example, the display surface 114 may include cloth or another material coupled to the substrate 112. In some embodiments, the display surface 114 may include a material, such as that of an airbag, and may be deployed between a viewing position (in which it is raised and forms the display surface) and a stowed position (in which it is lowered to provide an unobstructed view).

The plurality of lenticular lenses 116 may include any quantity of lenticular lenses 116. The plurality of lenticular lenses 116 may include an array of lenses designed such that when viewed from slightly different angles, different images are magnified. In that regard, the light source 118 may be controlled to cause the lenticular lenses 116 to center an image at various locations on the display surface 114. This may include centering the image at multiple locations on the display surface 114 such that multiple passengers in the vehicle 100 may view the same image at different locations.

The light source 118 may include any light source capable of generating an image. For example, the light source 118 may include a projector capable of displaying an image towards the plurality of lenticular lenses 116, and a mirror behind the lenticular lenses 116 may reflect an image towards one or more passengers. As another example, the light source 118 may include an LCD, plasma, or similar display located behind the plurality of lenticular lenses 116 for generating an image to be viewed by one or more passengers.

The eye tracker 120 may include any sensor or other device capable of detecting a relative location of the eyes of a driver or a passenger. In some embodiments, the vehicle 100 may include a quantity of eye trackers 120 that is equal to a maximum quantity of passengers of the vehicle 100. The eye trackers 120 may include, for example, a camera or other imaging device capable of detecting a location of the eyes of the driver or passengers (i.e., vehicle users).

The ECU 102 may control the light source 118 to display the image based on the location of the eyes of the vehicle users. For example, the ECU 102 may control the light source 118 to cause the image to be centered at the location of the eyes of the vehicle users. In some embodiments, the eye trackers 120 may detect where the users are looking, and the ECU 102 may center the image where the users are looking. Use of the lenticular lenses 116 allows a single image to be centered at multiple locations on the display surface 114. In that regard, the combination of the lenticular lenses 115 and the light source 118 is sufficient to allow the single image to be centered at multiple locations based on the detected location of multiple pairs of eyes.

The floor cushion 122 may include any material and be capable of conversion between a raised or seating position in which the floor cushion 122 forms a shape (such as a bench or a chair for seating) and a stowed position in which the floor cushion 122 is lowered or otherwise stowed to increase a viewing area of the display surface 114. The floor cushion 122 may include materials such as cloth, rubber, or the like suitable for seating or other uses such as an arm rest, a center console, or the like. In some embodiments, the floor cushion 122 may include a material similar to that of an airbag.

The floor cushion 122 may be converted between the raised and stowed position in any of a variety of manners. For example, a frame 124 may be coupled to the floor cushion 122 or otherwise located beneath the floor cushion 122. The frame 124 may include one or more actuators capable of actuating the frame between two or more positions. In that regard, the ECU 102 may identify a quantity of vehicle users and may control the frame 124 to cause the floor cushion 122 to form a quantity of seats that is equal to the quantity of vehicle users. In some embodiments, the frame 124 may include multiple portions each coupled to a portion of the floor cushion 122 and capable of changing the corresponding portion of the floor cushion 122 between the raised and the stowed position. For example, each portion of the floor cushion 122 may correspond to a seat, a center console, an arm rest, or the like.

As another example, a pump 126 may be coupled to the floor cushion 122. The pump 126 may pump air or another material into the floor cushion 122 to raise the floor cushion 122 into the raised position. Similarly, the pump 126 may include a valve capable of releasing the air or other material from the floor cushion 122 to lower the floor cushion 122 into the stowed position. In some embodiments, the pump 126 may include multiple pumps each coupled to a portion of the floor cushion 122 and may each cause a separate portion of the floor cushion 122 to move between the raised and stowed position. In that regard, the ECU 102 may control the pump or pumps 126 to configure the floor cushion 122 into a desired configuration based on a quantity of vehicle users and/or data received from the input device 144.

The camera 128, the radar sensor 130, and the LIDAR sensor 132 may be used to detect objects near the main body 108. The ECU 102 may use the detected data from the camera 128, the radar sensor 130, and the LIDAR sensor 132 to identify objects near the main body 108. Based on the identified objects, the ECU 102 may control acceleration and steering of the vehicle 100. In that regard, the vehicle 100 may be autonomous or semi-autonomous and the ECU 102 may be capable of controlling operations of the vehicle 100 with no or minimal user input.

The outer display 142 may include any display technology such as an LCD display, a plasma display, an e-paper display, a LED display, a lightbulb display, or the like. The outer display 142 may be positioned on the main body 108 and may be viewable by persons outside of the passenger compartment 110. The ECU 102 may determine current or upcoming vehicle operation such as acceleration, turning, braking, or the like. The ECU 102 may control the outer display 142 to display information corresponding to the vehicle operation. For example, the ECU 102 may control the outer display 142 to display a turn signal prior to a turn of the vehicle 100, braking signals in response to vehicle braking, or the like.

The e-paper layer 146 may include a layer of e-paper located around the main body 108. The e-paper layer 146 may be controlled by the ECU 102 to have one or more patterns or colors. For example, a user may provide a desired vehicle look (such as a vehicle pattern, color, or the like) via the input device 144, and the ECU 102 may control the e-paper layer 146 to cause the vehicle 100 to have the desired vehicle look.

The input device 144 may include any input device such as a keyboard, a mouse, buttons, a microphone, or the like capable of receiving user input. In some embodiments, the user may provide input from a remote device and the input device 144 may wirelessly receive the input. A user may provide input such as a quantity of vehicle users, a desired configuration of the passenger compartment 110, a desired vehicle look, or the like via the input device 144. The ECU 102 may control various components of the vehicle 100 (such as the frame 124, the pump 126, or the e-paper layer 146) based on the received input. Similarly, a user may request certain information (such as a movie or a TV show) to be displayed via the light source 118 and the lenticular lenses 116, and the ECU 102 may control the light source 118 to generate and display the information. In some embodiments, the user may provide input requesting a full view of the area surrounding the vehicle 100. In that regard, the ECU 102 may control the light source 118 to cease emitting light such that no information is displayed, increasing the viewing area of the exterior of the vehicle 100.

Figure 2:
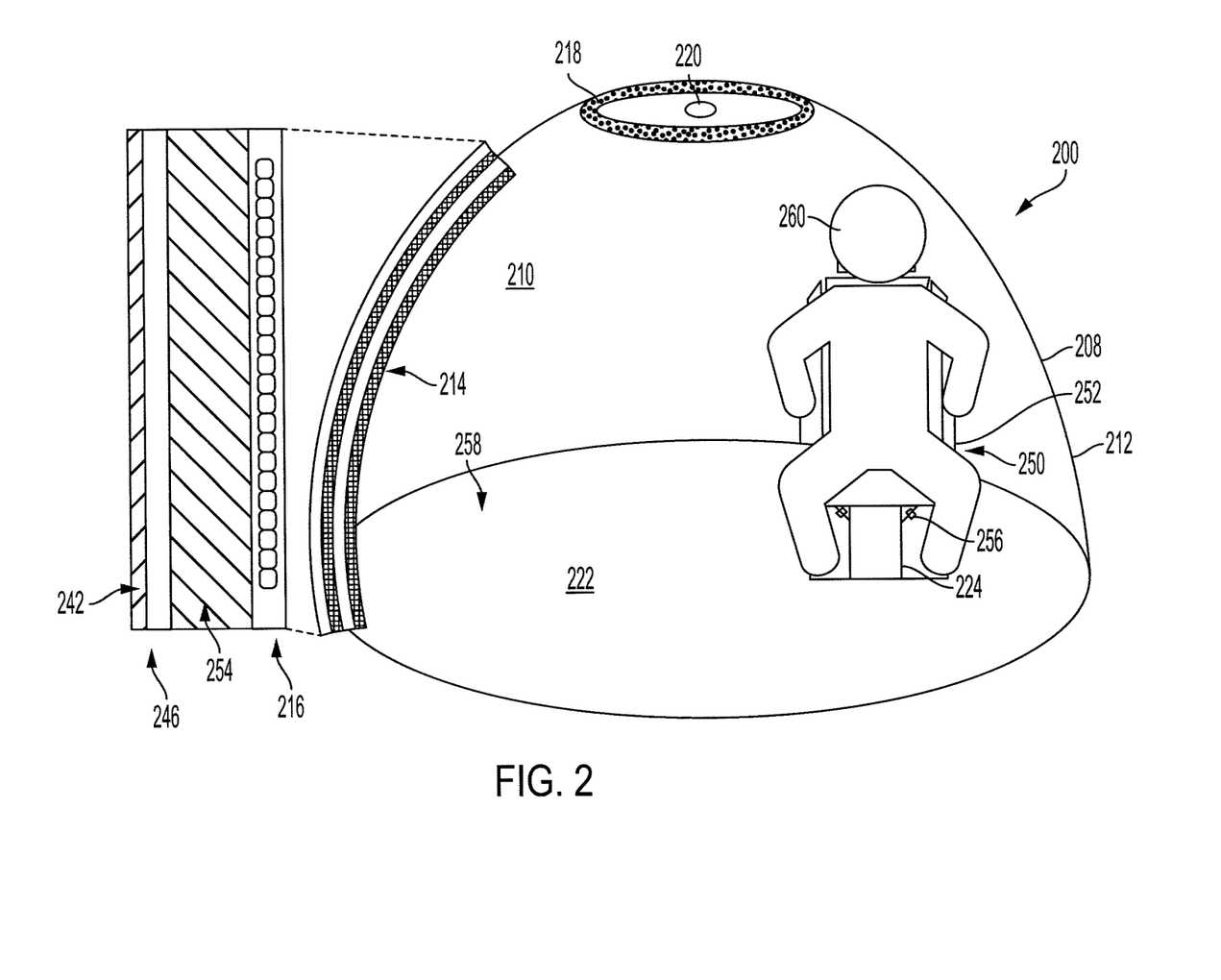
FIG. 2 is a drawing of a vehicle that includes a system for providing an advanced display system using lenticular lenses according to an embodiment of the present invention.

Turning now to FIG. 2, an exemplary vehicle 200 for displaying information is shown. The vehicle 200 includes similar features as the vehicle 100 of FIG. 1. The vehicle 200 includes a main body 208 that defines a passenger compartment 210. The main body 208 may be formed by a substrate 212 such as glass, plastic, metal, or the like. In some embodiments, the substrate 212 may form a majority of the main body 208. In some embodiments, a metal frame or other structural component may be included in the main body 208 to provide protection against vehicle crashes.

The substrate 212 may include a display surface 214 located thereon. The display surface 214 may include multiple layers capable of displaying data to passengers inside the passenger compartment 210 along with individuals outside of the vehicle 200. In some embodiments, the display surface 214 may encompass all or a majority of the interior surface of the main body 208. The display surface 214 may include a plurality of lenticular lenses 216 located thereon.

The lenticular lenses 216 may be oriented to at least one of provide a three-dimensional display or generate an image that may be centered at multiple locations on the display surface 214.

The display surface 214 may further include a mirror 254 positioned behind the lenticular lenses 216. In that regard, the lenticular lenses 216 may be located between the mirror 254 and the passenger compartment 210. The vehicle 200 may further include a projector array 218 located in the passenger compartment 210. The projector array 218 may project an image onto the lenticular lenses 216 which may be reflected by the mirror 254 back through the lenticular lenses 216 towards the passenger compartment 210. The vehicle 200 may further include an eye tracker 220 designed to determine a location of eyes of one or more passengers relative to the display surface 214. In that regard, an ECU (not shown) of the vehicle 200 may control the projector array 218 to generate light towards the display surface 214 to generate an image that will be centered on the display surface 214 at the determined location of the eyes.

The vehicle 200 may further include an outer display 242. The outer display 242 may include, for example, a plurality of LEDs oriented around the main body 208. The outer display 242 may output information corresponding to operations of the vehicle such as a turn signal, brake lights, or the like.

The vehicle 200 may also include an e-paper layer 246. The e-paper layer 246 may be controlled to change in color and shape. In that regard, a user may provide input via an input device (not shown) indicating a desired vehicle look. The desired vehicle look may include a color, a pattern, or the like. The ECU may control the e-paper layer 246 to output the desired vehicle look. For example, the e-paper layer 246 may surround the entire main body 208 and may be used to change the color of the main body 208 between any color such as red, blue, green, yellow, or the like. Use of e-paper in this situation may be desirable due to the low power consumption of the e-paper. In that regard, the desirable vehicle look may be achieved while sacrificing relatively little vehicle efficiency.

The vehicle 200 may further include a floor cushion 222. The floor cushion 222 may have multiple portions that each correspond to a certain passenger compartment 210 feature such as a seat, an armrest, a center console, or the like. For example, the floor cushion 222 includes a first portion 250 that corresponds to a seat 252. The vehicle 200 may further include a frame 224 that corresponds to the portion 250. The frame 224 may include multiple actuators 256 that may be used to actuate the frame 224 between a raised position and a lowered position. By moving the frame 224 between the raised position and the lowered position, the first portion 250 of the floor cushion 222 may be moved between the raised position (forming the seat 252) and a stowed position.

A second portion 258 of the floor cushion 222 may likewise be moved between a raised (seating) position and a stowed position. In response to the second portion 258 being in the stowed position, the passenger 260 may have a greater view of the display surface 214. In that regard, the ECU of the vehicle 200 may control the actuators 256 to cause the floor cushion 222 to only form the quantity of seats corresponding to a quantity of vehicle users.

In some embodiments, the vehicle user 260 may desire to look outside of the main body 208. In that regard, the mirror 254 may be controlled between a reflective state in which it reflects the light from the projector array 218 and a transparent state in which it fails to reflect light. In that regard, the user 260 may provide input requesting to view outside of the main body 208, and the ECU may control the mirror 254 to be in the transparent state. The ECU may further control the projector array 218 to cease generating the light. In response to receiving input requesting to view media or other images, the ECU may control the mirror 254 to be in the reflective state and may control the projector array 218 to generate the media or other images.

Figure 3:
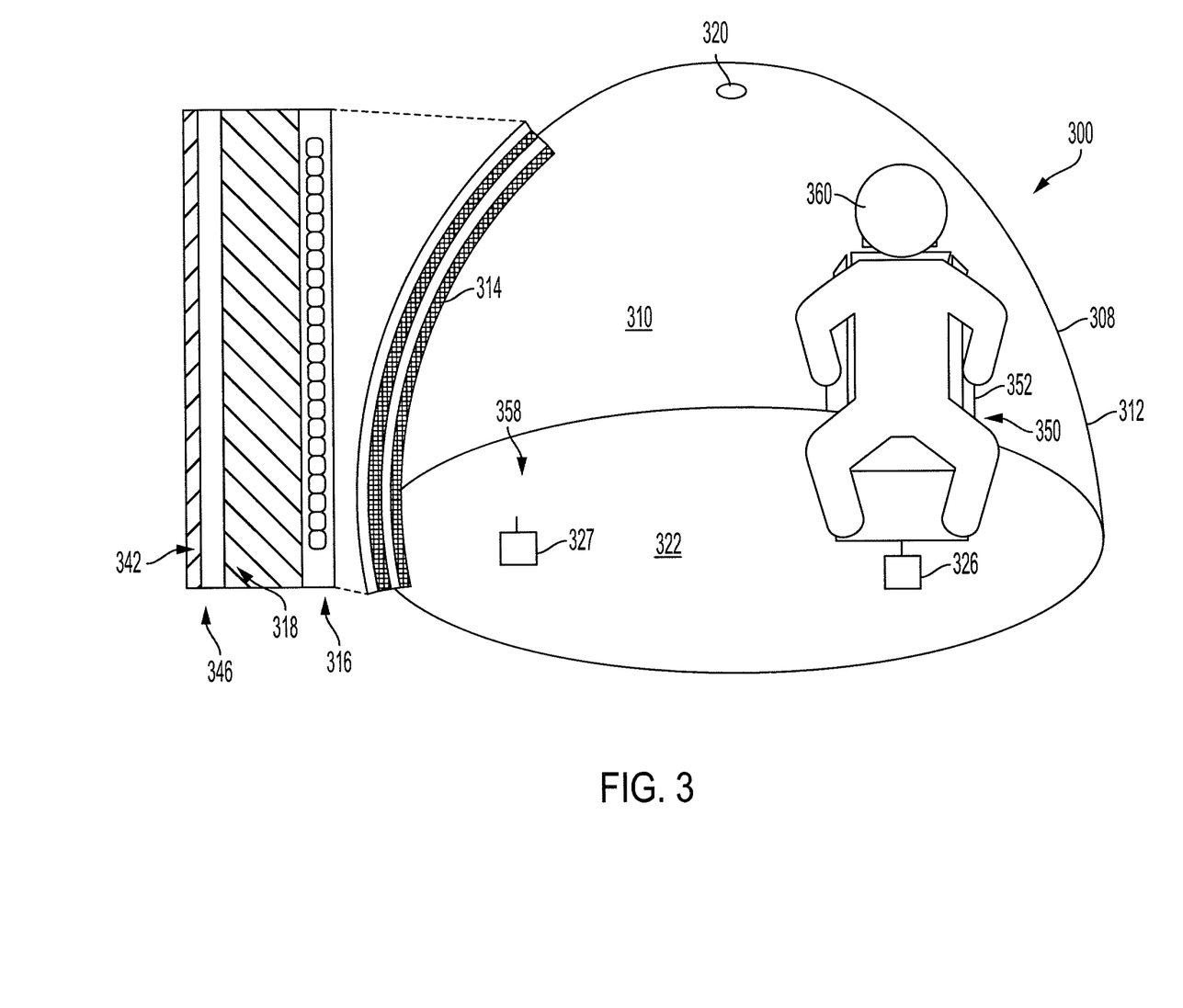
FIG. 3 is a drawing of a vehicle that includes a system for providing an advanced display system using lenticular lenses according to an embodiment of the present invention.

Turning now to FIG. 3, an exemplary vehicle 300 for displaying information is shown. The vehicle 300 includes similar features as the vehicle 100 of FIG. 1. The vehicle 300 includes a main body 308 that defines a passenger compartment 310. The main body 308 may be formed by a substrate 312 such as glass, plastic, metal, or the like. In some embodiments, the substrate 312 may form a majority of the main body 308. In some embodiments, a metal frame or other structural component may be included in the main body 308 to provide protection against vehicle crashes.

The substrate 312 may include a display surface 314 located thereon or may be formed by the display surface 314. In some embodiments, the display surface 314 may encompass all or a majority of the substrate 312 surface. The display surface 314 may include multiple layers capable of displaying data to passengers inside the passenger compartment 310 along with individuals outside of the vehicle 300. The display surface 314 may include a plurality of lenticular lenses 316 located thereon. The lenticular lenses 316 may be oriented to at least one of provide a three-dimensional display or generate an image that may be centered at multiple locations on the display surface 314.

The display surface 214 may further include a light source 318 positioned behind the lenticular lenses 316. In that regard, the lenticular lenses 316 may be located between the light source 318 and the passenger compartment 310. The light source 318 may include, for example, an LCD display, a plasma display, or another display technology. The light source 318 may generate an image that projects through the lenticular lenses 316. The vehicle 300 may further include an eye tracker 320 designed to determine a location of eyes of one or more passengers relative to the display surface 314. In that regard, an ECU (not shown) of the vehicle 300 may control the light source 318 to generate light through the lenticular lenses 316 that will be centered on the display surface 314 at the determined location of the eyes.

The vehicle 300 may further include an outer display 342. The outer display 342 may include, for example, a plurality of LEDs oriented around the main body 308. The outer display 342 may output information corresponding to operations of the vehicle such as a turn signal, brake lights, or the like.

The vehicle 300 may also include an e-paper layer 346. The e-paper layer 346 may be controlled to change in color and shape. In that regard, a user may provide input via an input device (not shown) indicating a desired vehicle look. The desired vehicle look may include a color, a pattern, or the like. The ECU may control the e-paper layer 346 to output the desired vehicle look. For example, the e-paper layer 346 may surround the entire main body 308 and may be used to change the color of the main body 308 between any color such as red, blue, green, yellow, or the like. Use of e-paper in this situation may be desirable due to the low power consumption of the e-paper. In that regard, the desirable vehicle look may be achieved while sacrificing relatively little vehicle efficiency.

The vehicle 300 may further include a floor cushion 322. The floor cushion 322 may have multiple portions that each correspond to a certain passenger compartment 310 feature such as a seat, an armrest, a center console, or the like. For example, the floor cushion 322 includes a first portion 350 that corresponds to a seat 352. The vehicle 300 may further include a first pump 326 that corresponds to the portion 350. The pump 326 may direct air or another fluid into the first portion 350 to move the first portion 350 into a raised position. By moving the first portion 350 into the raised position, the first portion 350 of the floor cushion 322 may be moved into the raised position (forming the seat 352). The pump 326 may further include a valve (not shown) that allows the air or other fluid to flow from the first portion 350 to cause the first portion 350 to lower into a stowed position.

A second portion 358 of the floor cushion 322 may likewise be moved between a raised (seating) position and a stowed position. A second pump 327 may be used to move the second portion 358 between the raised position and the stowed position. In response to the second portion 358 being in the stowed position, the passenger 360 may have a greater view of the display surface 314. In that regard, the ECU of the vehicle 300 may control the pumps 326, 327 to cause the floor cushion 322 to only form the quantity of seats corresponding to a quantity of vehicle users.

In some embodiments, the vehicle user 360 may desire to look outside of the main body 308. In that regard, the light source 318 may be controlled to be off, thus turning off the display and allow viewing outside of the main body 308. In response to receiving input requesting viewing of additional media, the ECU may control the light source 318 to again generate the light.

Figure 4:
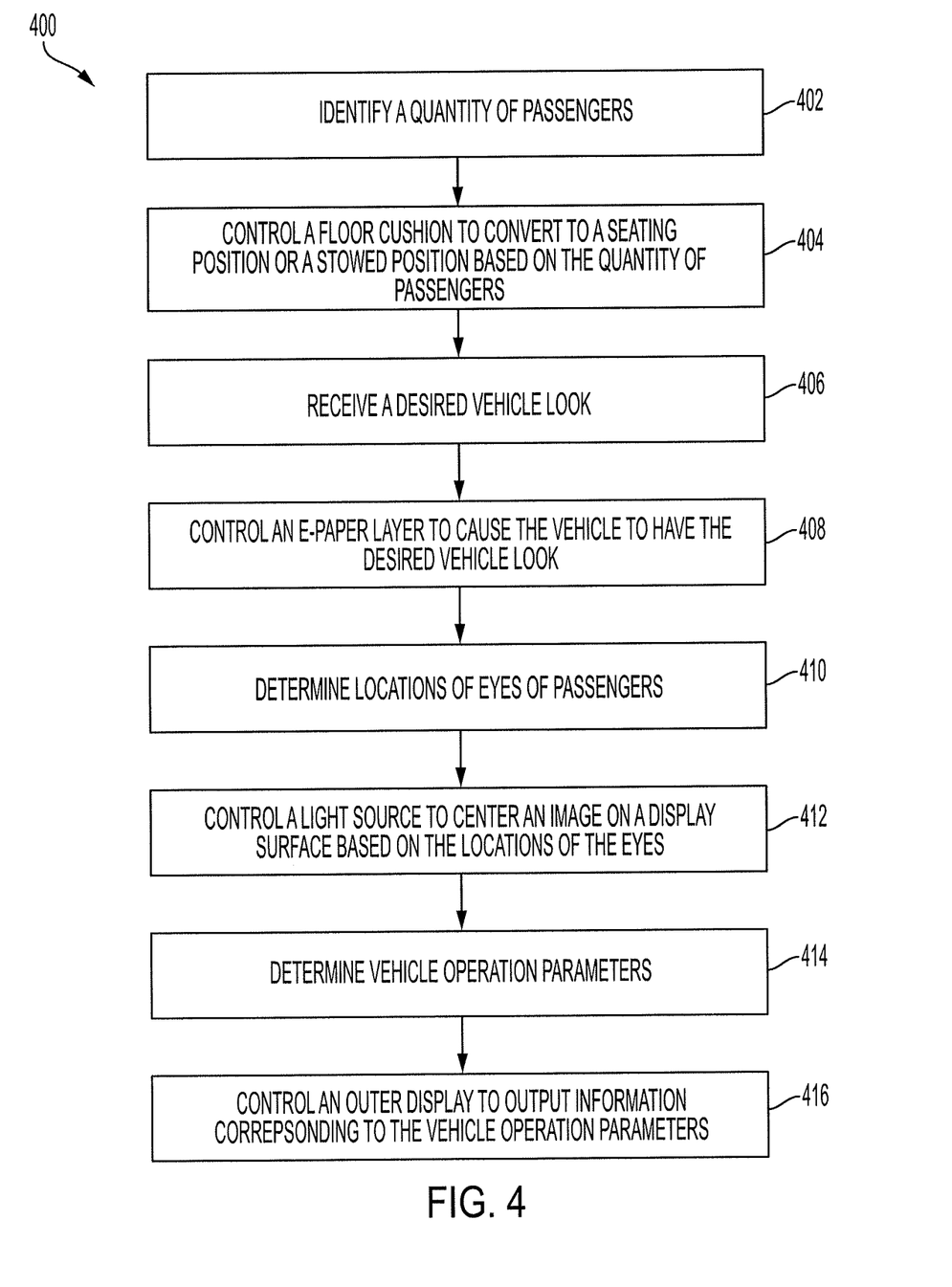
FIG. 4 is a flowchart illustrating a method for controlling an advanced display system in a vehicle according to an embodiment of the present invention.

Referring now to FIG. 4, a method 400 for controlling a vehicle, such as the vehicle 100 of FIG. 1, is shown. The method 400 may begin in block 402 where the ECU may identify a quantity of passengers or vehicle users. For example, the vehicle may be a rideshare vehicle and a user may indicate a quantity of passengers using an app. As another example, a camera of the vehicle may detect a quantity of persons near the vehicle and may determine the quantity of passengers based on the quantity of persons near the vehicle. As another example, a sensor may detect a quantity of passengers entering the vehicle and the ECU may determine the quantity of vehicle users based on the quantity of passengers entering the vehicle. As yet another example, a vehicle user may provide input via an input device indicating the quantity of passengers.

In block 404, the ECU may control a floor cushion to convert to one or more seating positions or one or more stowed positions based on the quantity of passengers. For example, the ECU may control actuators or pumps associated with portions of the floor cushion to cause the corresponding portion of the floor cushion to raise into the seating position or lower into the stowed position based on the quantity of passengers. If two passengers will be riding in the vehicle then the ECU may control actuators or pumps to cause two seats to form from the floor cushion. In some embodiments, the ECU may select the seats to be formed based on a desire to maximize viewing area of the display surface for each passenger.

In block 406, the ECU may receive or determine a desired vehicle look. For example, the desired vehicle look may be received by a passenger via an input device. As another example, if the vehicle is a rideshare vehicle, the user may request the vehicle look using an app used to request pickup by the vehicle.

In block 408, the ECU may control an e-paper layer of the vehicle to cause the vehicle to have the desired vehicle look. For example, the ECU may control the e-paper layer to cause the vehicle to have a certain color, pattern, or the like.

In block 410, the ECU may determine locations of eyes of passengers of the vehicle based on data detected by one or more eye trackers. For example, the vehicle may include one eye tracker for each potential seat in the vehicle, and each eye tracker may be assigned to an individual seat. The corresponding eye tracker may detect data corresponding to the location of the eyes of the passenger relative to the display surface. For example, the eye trackers may detect a location corresponding to a location on the display surface at which the individual is looking at. The ECU may determine where on the display surface each individual is looking.

In block 412, the ECU may control a light source to center an image on the display surface based on the locations of the eyes, including where on the display surface each pair of eyes is looking at. Due to the presence of the lenticular lenses on the display surface, the light source may center a single image at multiple locations so that the image is centered at locations at which each set of eyes is looking at. In that regard, the ECU may control the light source to center the image at the location of where each set of eyes is looking at based on the characteristics of the lenticular lenses. Additionally, the ECU may control the light source to generate a three-dimensional image using the lenticular lenses.

In block 414, the ECU may determine vehicle operation parameters corresponding to vehicle operations. The vehicle operation parameters may correspond to commands received by a driver or determined by the ECU. For example, the parameters may correspond to whether the vehicle is turning, braking, or the like.

In block 416, the ECU may control an outer display to display information corresponding to the vehicle operation parameters. In some embodiments, the parameters may further include the name of a party being picked up by a rideshare vehicle. For example, a user may request a rideshare pickup using an app, and the ECU may control the outer display to display the name of the party being picked up to make finding the vehicle easier.

Where used throughout the specification and the claims, "at least one of A or B" includes "A" only, "B" only, or "A and B." Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for displaying data inside of a vehicle, comprising:
   a main body including a substrate forming an inner display surface on an interior of the main body and an outer display surface on an exterior of the main body, the inner display surface at least partially defining a vehicle interior;
   a plurality of lenticular lenses located on the inner display surface;
   an eye tracker configured to detect a location of eyes of a person relative to the inner display surface;
   a light source configured to generate light to produce an image via the plurality of lenticular lenses;

an input device configured to receive user input corresponding to a desired vehicle look of the outer display surface; and
an electronic control unit (ECU) coupled to the eye tracker, the light source, and the input device, and configured to:
  determine the location of the eyes relative to the inner display surface,
  control the light source to center the image based on the location of the eyes relative to the inner display surface, and
  control the outer display surface based on the user input.

2. The system of claim 1 further comprising a floor cushion located in the vehicle interior and configured to convert between a seating position to form a platform for seating at least one driver or passenger of the vehicle and a stowed position for increasing a viewable area of the inner display surface.

3. The system of claim 2 further comprising a frame coupled to the floor cushion and configured to raise to cause the floor cushion to move into the seating position and to lower to cause the floor cushion to move to the stowed position.

4. The system of claim 2 further comprising a pump configured to pump air into the floor cushion to cause the floor cushion to move into the seating position and a valve configured to release the air from the floor cushion to cause the floor cushion to move to the stowed position.

5. The system of claim 1 further comprising a reflective surface, wherein the light source includes a projector, the plurality of lenticular lenses is located between the reflective surface and the projector, and the light source is located inside of the vehicle interior and configured to project the light towards the plurality of lenticular lenses such that the image is generated by the reflected light and the plurality of lenticular lenses.

6. The system of claim 1 wherein the light source includes a display configured to generate the light, wherein the plurality of lenticular lenses is located between the eye tracker and the display, and the display is configured to display the light towards the plurality of lenticular lenses to generate the image.

7. The system of claim 1 wherein:
the eye tracker is further configured to detect a second location of a second set of eyes corresponding to a second person relative to the inner display surface; and
the ECU is further configured to control at least one of the light source or the plurality of lenticular lenses to center a second image based on the location of the second set of eyes.

8. The system of claim 1 wherein the outer display surface includes an e-paper layer coupled to the outside of the main body and is further configured to output data including information corresponding to the operation of the vehicle.

9. The system of claim 1 wherein the substrate is clear, and the ECU is configured to cause the light source to cease generating the light to enable viewing scenery outside of the vehicle by at least one user of the vehicle.

10. A system for displaying data inside of a vehicle, comprising:
a main body including a substrate forming an inner display surface on an interior of the main body and an outer display surface on an exterior of the main body, the inner display surface at least partially defining a vehicle interior;
a floor cushion located in the vehicle interior and configured to convert between a seating position to form a platform for seating at least one driver or passenger of the vehicle and a stowed position for increasing a viewable area of the inner display surface;
a plurality of lenticular lenses located on the inner display surface;
a light source configured to generate light to produce an image via the plurality of lenticular lenses;
an input device configured to receive user input corresponding to a desired vehicle look of the outer display surface; and
an electronic control unit (ECU) coupled to the light source and the input device and configured to:
  control the light source to produce the image,
  control the floor cushion between the seating position and the stowed position, and
  control the outer display surface based on the user input.

11. The system of claim 10 further comprising a frame coupled to the floor cushion and configured to raise to cause the floor cushion to move into the seating position and to lower to cause the floor cushion to move to the stowed position.

12. The system of claim 10 further comprising a pump configured to pump air into the floor cushion to cause the floor cushion to move into the seating position and a valve configured to release the air from the floor cushion to cause the floor cushion to move to the stowed position.

13. The system of claim 10 further comprising a reflective surface, wherein the light source includes a projector, the plurality of lenticular lenses is located between the reflective surface and the projector, and the light source is located inside of the vehicle interior and configured to project the light towards the plurality of lenticular lenses such that the image is generated by the reflected light and the plurality of lenticular lenses.

14. The system of claim 10 wherein the light source includes a display configured to generate the light, wherein the plurality of lenticular lenses is located between the eye tracker and the display, and the display is configured to display the light towards the plurality of lenticular lenses to generate the image.

15. The system of claim 10 further comprising at least one eye tracker configured to detect a first location of a first pair of eyes corresponding to a first person relative to the inner display surface, and to detect a second location of a second pair of eyes corresponding to a second person relative to the inner display surface, wherein the ECU is configured to control at least one of the light source or the plurality of lenticular lenses to center a first copy of the image based on the first location of the first pair of eyes and to center a second copy of the image based on the second location of the second pair of eyes.

16. The system of claim 10 wherein the outer display surface includes an e-paper layer coupled to the outside of the main body.

17. A method for displaying data inside and outside of a vehicle, comprising:
detecting, by an eye tracker, eye data corresponding to a location of eyes of a person relative to an inner display surface in a vehicle interior of the vehicle;
receiving, by an input device, user input corresponding to a desired vehicle look of the outer display surface;
determining, by an electronic control unit (ECU), a location of the eyes relative to the display surface based on the eye data;

controlling, by the ECU, a light source to center an image on the inner display surface of a substrate via a plurality of lenticular lenses based on the location of the eyes relative to the inner display surface; and controlling, by the ECU, an outer display surface of the substrate based on the user input.

18. The method of claim 17 further comprising controlling, by the ECU, a floor cushion to convert between a seating position to form a platform for seating at least one driver or passenger of the vehicle and a stowed position for increasing a viewable area of the inner display surface.

19. The method of claim 17 further comprising:
detecting, by the eye tracker or a second eye tracker, a second location of a second set of eyes corresponding to a second person relative to the inner display surface; and controlling, by the ECU, at least one of the light source or the plurality of lenticular lenses to center a second image based on the location of the second set of eyes.

20. The method of claim 17 wherein the outer display surface includes an e-paper layer coupled to an outside of a main body of the vehicle.

\* \* \* \* \*